United States Patent [19]

Touborg

[11] 4,220,476
[45] Sep. 2, 1980

[54] CEMENT KILN PLANTS

[75] Inventor: Jorn Touborg, Copenhagen, Denmark

[73] Assignee: F. L. Smidth & Co., Copenhagen, Denmark

[21] Appl. No.: 942,454

[22] Filed: Sep. 14, 1978

[30] Foreign Application Priority Data

Sep. 14, 1977 [GB] United Kingdom ............... 38317/77

[51] Int. Cl.$^2$ ............................................. C04B 7/02
[52] U.S. Cl. ....................................... 106/100; 55/1; 55/262; 55/344; 55/345; 432/14; 432/106
[58] Field of Search ..................... 55/342, 1, 344, 345, 55/262, 349; 432/58, 14, 106; 34/10, 57 A; 209/11, 144; 106/100

[56] References Cited

U.S. PATENT DOCUMENTS

| 746,261 | 12/1903 | Baggaley | 55/295 |
| 1,731,457 | 10/1929 | Fasting | 432/106 |
| 1,909,820 | 5/1923 | Falla | 432/2 |
| 2,590,090 | 3/1952 | DeVaney | 432/5 |
| 2,823,910 | 2/1958 | Ravasio | 432/80 |
| 3,022,989 | 2/1962 | Pyzel | 106/100 |
| 3,116,054 | 12/1963 | Bartman | 432/58 |
| 3,151,187 | 9/1964 | Comple | 261/3 |
| 3,212,764 | 10/1965 | Muller et al. | 106/100 |
| 3,235,239 | 2/1966 | Peterson | 106/100 |
| 3,317,201 | 5/1967 | Müller et al. | 106/100 |

Primary Examiner—Bernard Nozick
Attorney, Agent, or Firm—Pennie & Edmonds

[57] ABSTRACT

A method is disclosed for operating a cement kiln plant in which impurities in the form of alkalis are present in vapor form in the hot dust laden gases generated in the kiln. According to the method, a portion of the hot dust laden kiln gases are directed upwardly through a first riser pipe which communicates with the kiln exit gas opening and thereafter the dust particles are separated from the gases and directed to the bottom portion of a second riser pipe having its lower end open to the atmosphere. Relatively cold atmospheric air is directed upwardly through the second riser pipe so as to contact the kiln dust particles separated from the by-passed kiln gases of the first riser pipe thus permitting the kiln dust particles to be cooled by the cold air while causing the air to be heated and providing its further use e.g. in a preheater. The velocity of the cold air directed through the second riser pipe is preferably controlled such that the heavier of the alkali kiln dust particles are permitted to fall downwardly through the second riser pipe countercurrent to the flow of air while the lighter of the kiln dust particles are entrained in the upwardly flowing air. Ultimately the kiln gases from the first riser pipe are combined with the preheated air from the second riser pipe and the combined gases may be directed to preheaters. Thus the method permits the removal of the heavier alkali laden particles from the cement kiln system by merely removing those particles from the second riser pipe. A cement kiln plant for practicing the inventive method is also disclosed.

17 Claims, 2 Drawing Figures

CEMENT KILN PLANTS

BACKGROUND OF THE INVENTION

1. Field of the Invention

The invention relates to a method of extracting alkalis, which are present in the form of vapours, from the hot dust-laden kiln gases of a cement kiln. The alkalis are removed by passing the kiln gases up through a first riser pipe in which the alkali vapours condense on cold bodies which are brought into contact with the gas at the bottom of the riser pipe. The invention also pertains to a cement kiln plant for practicing the method.

2. Description of the Prior Art

When manufacturing cement from raw materials containing alkali impurities many difficulties arise. In the present specification the term "alkalis" is used broadly and designates not only the oxides and hydroxides of the alkali metals, but also chlorine and sulphur compounds.

The alkalis evaporate in the hot kiln, and are entrained by the hot kiln gases and directed to the preheaters for the raw materials. The alkali vapours condense on the cold raw materials and are thereby carried back to the kiln, where the alkalis evaporate once again. Thus an undesired accumulation of circulating alkalis takes place in the plant.

A number of methods of removing at least part of the alkalis from the hot kiln gases have been developed in the course of time. Some of these methods are based upon bringing cold (so-called pyrator) bodies into contact with at least part of the hot kiln gases at the inlet end of the kiln. The alkalis will then condense on the cold bodies while the kiln gases—thus relieved of at least part of its alkali—are led to the preheaters. In the past, various types of objects have been utilized as pyrator bodies. For example, chains and steel hails have been utilized whereby after use, these bodies have been relieved of the alkalis and reused. In an attempt to avoid the often cumbersome process of cleansing the used chain or steel hails, bodies have been used which can be thrown away after use, e.g. pulverized cement raw materials or precipitated dust. However, in such cases it is necessary to select bodies which would not involve significant losses.

U.S. Pat. No. 3,317,201 to Müller et al. utilizes as pyrator bodies, the cold dust from the system electrofilter or unpreheated raw materials. These cold bodies are brought into contact with the hot kiln gases in a riser pipe which continues as the tangential inlet tube to a cyclone separator in which the alkali-laden pyrator bodies are precipitated. Part of the separated material is removed and another part is cooled and led to the bottom of the riser pipe together with the filter dust or unpreheated raw materials. Which part of the precipitated material is removed from the system and which part is recirculated is determined statistically and not according to the extent to which the individual particles have increased in weight due to alkali precipitation. Where the bodies used are constituted by the very fine dust from the electrofilter it may occur that the particles are insufficiently heavy for precipitation in a cyclone separator, even after alkalis have precipitated thereon. Correspondingly, particles which are recirculated, will be too heavy, and will be led back to the kiln. Further, special dosing systems for the filter dust or the raw material thus used are necessary in the system described in the Müller et al. patent. I have invented a cement kiln plant and a method of operating the kiln plant in which the aforementioned difficulties are avoided.

SUMMARY OF THE INVENTION

A method of operating a cement kiln plant in which alkalis are present in the form of vapours in hot dust-laden kiln gases comprising by-passing at least a portion of the kiln gases upwardly through a first riser pipe communicating with the hot kiln exit gas opening, separating at least a portion of the kiln dust particles from the by-passed kiln gases and directing the kiln dust particles to the lower portion of a second riser pipe. Relatively cold gases preferably in the form of atmospheric air are directed upwardly through the second riser pipe so as to contact the kiln dust particles separated from the gases by-passed through the first riser pipe thereby permitting the kiln dust particles to be cooled by the air. At least a portion of the kiln dust particles is separated from the gases of the second riser pipe and the kiln dust thus separated is directed to the lower portion of the first riser pipe so as to contact the kiln gases by-passed upwardly therethrough. At least certain of the alkali-laden dust are then permitted to be removed from the second riser pipe.

Preferably, the second riser pipe is open to the atmosphere at its lower end and cold atmospheric air is directed upwardly through the second riser pipe by the operation of a fan positioned within the system downstream of the flow of gases in the first and second riser pipes. The velocity and amount of the air directed upward through the second riser pipe is preferably selectively controlled relative to the amount of gas flow directed upwardly through the first riser pipe by means of a throttle valve respectively communicating with each riser pipe so that the heavier of the alkali-laden dust particles directed to the second riser pipe are permitted to fall downwardly under the influence of gravity and the lighter of the dust particles become entrained in the upward flow of air.

Thus, according to the invention, the cold bodies are recirculated kiln dust particles, and the alkalis condensed onto the bodies are, in due course, removed from the plant with the particles onto which they are condensed. The heavier particles being those on which a greater amount of alkalis have condensed are to be precipitated under the influence of gravity and removed from the system while the lighter particles are cooled by, and entrained in the air flow in the second riser pipe for recycling through the system.

With the present inventive method it is possible to automatically provide (1) the necessary amount of pyrator bodies, (2) precipitation of the heavy, alkali-laden bodies, (3) recirculation and cooling of the lighter bodies with less alkali deposits, and (4) passage of the lightest particles i.e. the fine kiln dust, for example, to a preheater.

A cement kiln plant is disclosed which comprises a cement kiln, a first riser pipe communicating with the hot exit gas opening of said kiln to permit at least a portion of the hot kiln exit gases to be by-passed upwardly through said first riser pipe, a first particle separator communicating with the upper portion of said first riser pipe to receive the by-passed kiln gases and to separate kiln dust particles therefrom, a second riser pipe having its lower end open to the atmosphere and its upper end portion communicating with a second particle separator. Means is provided for directing the separated kiln dust particles from the first particle separator into the lower portion of the second riser pipe and means is provided for directing relatively cold atmospheric air upwardly through the second riser pipe so as to contact the kiln dust particles from the first cyclone separator and to entrain at least a portion of the kiln dust particles therein. The atmospheric air and entrained kiln dust particles are directed to the second particle separator for separation of the kiln dust particles, with means being provided to direct the kiln dust particles thus separated to the lower portion of the first riser pipe such that at least a portion of the kiln dust particles is entrained by the hot kiln exit gases by-passed through the first riser pipe.

In the preferred embodiment, while the lower end of the second riser pipe is open to the atmosphere, both the first and second riser pipes are connected tangentially to associated first and second cyclone separators wherein the kiln dust is separated from the respective gases.

Removal of the heavier alkali-laden kiln dust particles is accomplished in the preferred embodiment, through the second riser pipe by maintaining the lower end thereof open to the atmosphere and positioned over a collecting vessel for the precipitated material. The air velocity in the second riser pipe is adjusted so that the heavier particles fall under gravity against the flow of the air being sucked upwardly therethrough.

When the first dust particles exit the kiln, part of this dust (to wit, mainly the heaviest dust particles) will precipitate in the first cyclone and be carried to the second riser pipe. At this location the heaviest dust particles fall out into the collecting vessel and the lighter particles are led with the air being drawn upwardly up through the second riser pipe to the second cyclone. In the second cyclone most of the heaviest of these particles will be precipitated and led to the bottom of the first riser pipe. The particles being drawn upwardly through the second riser pipe and through the second cyclone will thus be cooled by the cooler air being sucked into the second riser pipe.

The cooled dust particles led from the second cyclone to the bottom of the first riser pipe now act as condensing bodies for the alkalis which are present in the hot kiln gases in the form of vapours. When alkalis condense on the particles, the particles will grow heavier. As these identical particles were already sufficiently heavy for precipitation in both the first and second cyclones, they will with every probability, be precipitated in the first cyclone and be led to the second riser pipe where they will be either: (1) entrained by the air being sucked into the second riser pipe and be cooled for renewed precipitation in the second cyclone and led back to the first riser pipe, or (2) they will be heavy enough to fall downwardly in countercurrent flow relative to the air flow and into the collecting vessel.

The central gas pipes leading from the two cyclones are preferably each provided with a throttle valve. The flow rates in the riser pipes and the cyclones can then be so adjusted that the amount of pyrator bodies, the extent of recirculation, and the smallest particle size precipitated will be as desired.

The central pipe of each cyclone may lead to a common suction conduit which communicates with a suction creating device such as an exhaust fan. The hot kiln gases which are directed through the common suction conduit are thus relieved of at least part of their alkalis, thus being mixed with the air drawn into the second riser pipe, may be passed to the preheaters of the plant.

In particular, the air from the second riser pipe is, to a certain extent, preheated through its contact with the hot pyrator bodies in the second riser pipe.

Alternatively separate means may be provided for removing part of the particles from the second riser pipe or the second cyclone. For example, the pipe leading from the outlet for precipitated material from the second cyclone may be provided with a branch pipe for removal of some of the material. Alternatively, a third cyclone may be inserted in the second riser pipe in series with the second cyclone, the third cyclone discharging its precipitated material into a collecting vessel.

BRIEF DESCRIPTION OF THE DRAWING

The present invention is described in detail below with reference to the drawings in which.

DETAILED DESCRIPTION OF THE PREFERRED EMBODIMENTS

Figure 1:
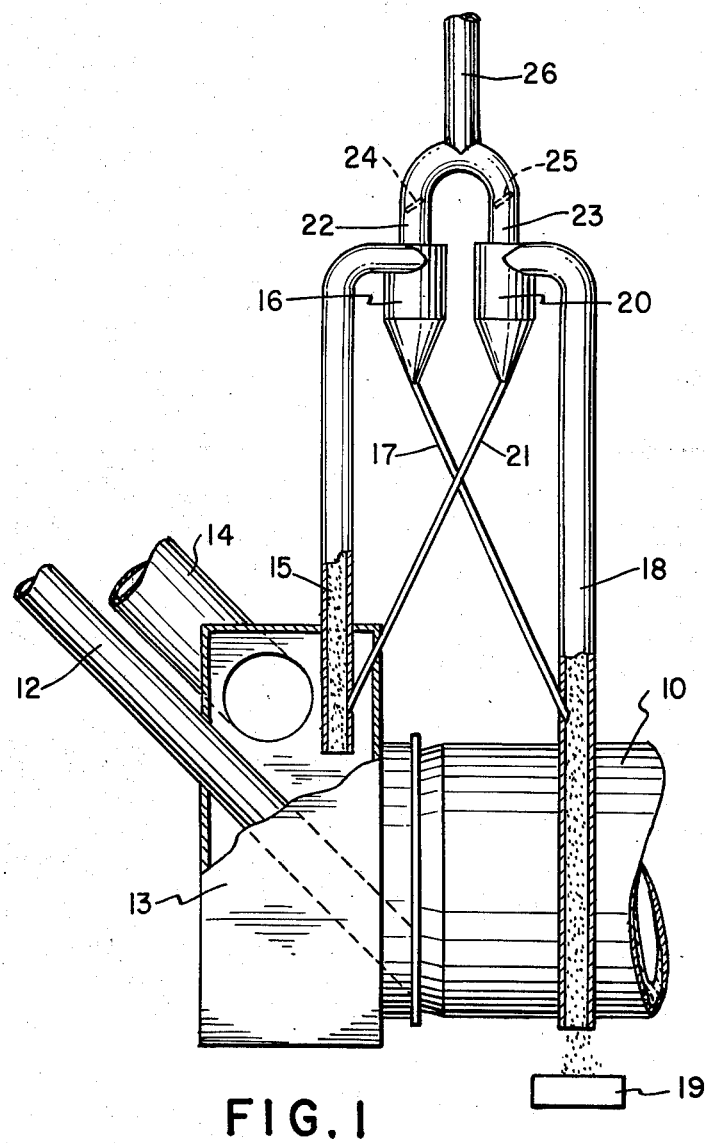
FIG. 1 is a side elevational view, partially in cross-section, illustrating a part of an inventive rotary cement kiln plant for practicing the method according to the invention.

Referring to the drawing, the inlet end of a rotary kiln 10 is provided with a kiln feed pipe 12, and is open to smoke chamber 13 having a smoke outlet port 14. Further, from the smoke chamber projects a riser pipe 15 which at its upper end is connected to the tangential inlet channel of a cyclone 16. The outlet opening for precipitated material from the cyclone 16 is, through a conduit 17, connected to the lower end of a riser pipe 18 which—somewhat under the point where the conduit 17 is connected—opens to the atmosphere over a collecting vessel 19. The upper end of the riser pipe 18 is connected to the tangential inlet channel to a cyclone 20, the outlet for separated material of cyclone 20 is through a conduit 21, connected to the lower end of the riser pipe 15 situated in the smoke chamber 13.

A throttle valve 24 is mounted in a central pipe 22 projecting from the cyclone 16 for adjusting the gas flow through the cyclone 16. Similarly, a throttle valve 25 for adjusting the gas flow through the cyclone 20 is mounted in a central pipe 23 projecting from the cyclone 20. The two central pipes 22 and 23 are, downstream from the throttle valves 24 and 25, connected to a common outlet conduit 26 through which the exit gases from the cyclones 16 and 20 may be removed e.g. for use in the preheaters of the plant. When the plant is operating, the dust-mixed kiln gas from the kiln 10 will flow into the smoke chamber 13, from which part of it will flow out through the smoke outlet port 14, and another part will be led through the riser pipe 15 to the cyclone 16 wherein part of the dust will precipitate. The dust thus precipitated is directed through the conduit 17 to be fed to the riser pipe 18 while the smoke gas is led away through the central pipe 22 and the common conduit 26.

The lower end of riser pipe 18 is open to the atmosphere so that a stream of cold atmospheric air is drawn upwardly therethrough so as to entrain and cool the dust fed through the conduit 17. Part of the dust particles will have such weight that they cannot be entrained by the sucked-in air, but in countercurrent to the air, will fall through the bottom of the riser pipe 18 and be collected in a vessel 19. The dust particles entrained by the air up through the riser pipe 18 are precipitated in the cyclone 20 in which the air (now heated by the particles) is taken out through the central pipe 23. The air from the central pipe 23 is then led away from the kiln 20 through the common conduit 26 together with the kiln gases from the cyclone 16. The cooled dust precipitated in the cyclone 20 is led through the conduit 21 to the lower end of the riser pipe 15 situated in the smoke chamber.

The cold particles from the cyclone 20 will now be entrained by the hot kiln gases up through the riser pipe 15. Because their temperature at this location is below the condensing temperature of the alkali vapours in the hot smoke gas, the alkalis will mainly deposit on the cold dust particles, which again, together with part of the fresh kiln dust accompanying the kiln gases, will be precipitated in the cyclone 16 and led to the riser pipe 18 where the heavy particles will fall out into the vessel 19. The lighter particles will in turn be entrained by the air flow and precipitated in the cyclone 20, and hence be led back to the riser pipe 15 again.

It will be appreciated that according to the method described new pyrator bodies will continuously be supplied and that pyrator bodies with alkalis deposited upon them will be recirculated until the alkalis deposited have imparted to them such weight that they can drop down into the vessel 19 in countercurrent to the upward air flow in the riser pipe 18.

By means of the throttle valve 24 in the central pipe 22 of the cyclone 16, the air flow rate in this cyclone and its riser pipe 15 may be so adjusted that only particles beyond a certain size are precipitated for use as pyrator bodies. In the same manner the air flow rate in the riser pipe 18 may, by adjusting the throttle valve 25 in the central pipe 23 of the cyclone 20, be so adjusted that particles beyond a certain size will fall down into the vessel 19 in countercurrent to the air flow. It should be noted that the dust particles selected for use as pyrator bodies in the cyclone 16 will fall out into the vessel 19 after having been circulated one or more times as these particles grow heavier by their circulation because of the deposited alkali.

Figure 2:
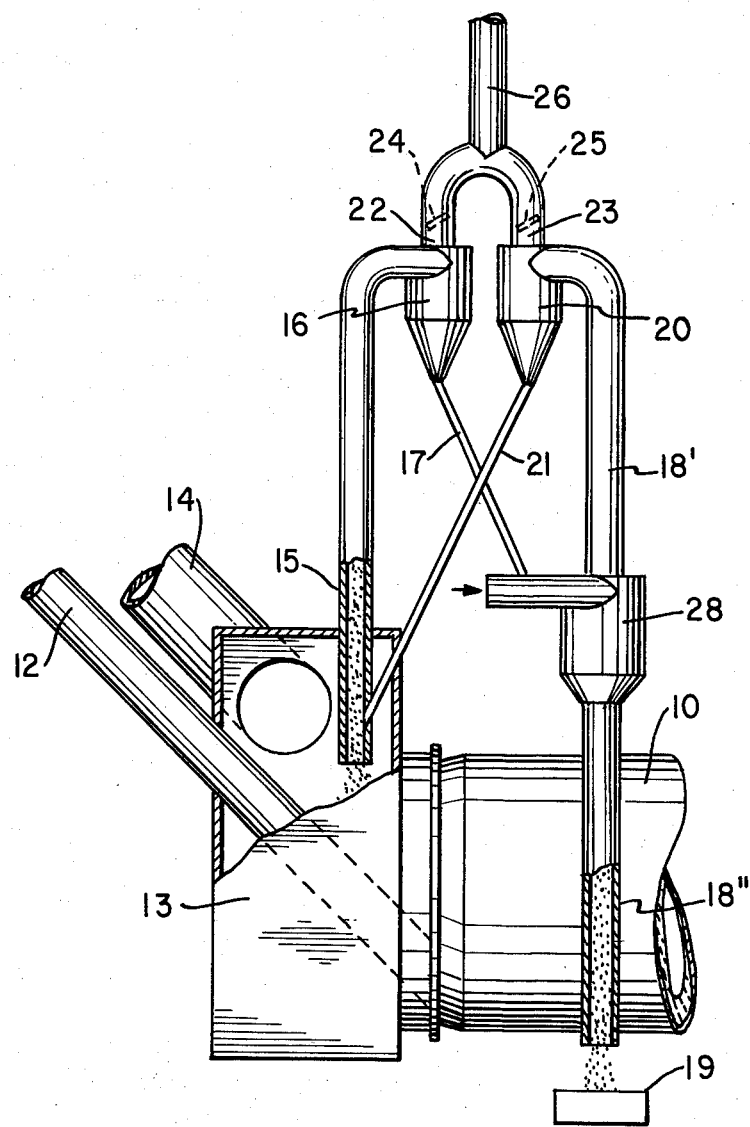
FIG. 2 is a view of a part of an alternate embodiment of the kiln plant of FIG. 1, illustrating a third cyclone separator in serial communication with the second riser pipe and the second cyclone separator.

FIG. 2 shows an alternate embodiment identical in all respects to the embodiment illustrated in FIG. 1 except for the addition of a third cyclone 28 serially connected at an upper end portion with riser pipe 18'. The third cyclone 28 is also connected at its tangential inlet channel by means of conduit 17 with the outlet opening of cyclone 16. The material outlet opening of the third cyclone 28 is connected to an outlet pipe 18" which allows any pyrator bodies with alkalis deposited upon them to drop down into vessel 19.

What is claimed is:

1. A method of operating a cement kiln plant in which alkalis are present in the form of vapours in hot dust-laden kiln gases comprising by-passing at least a portion of the kiln gases upwardly through a first riser pipe communicating with the hot kiln exit gas opening, separating at least a portion of the kiln dust particles from said by-passed kiln gases and directing said kiln dust particles to the lower portion of a second riser pipe, directing relatively cold gases upwardly through said second riser pipe so as to contact said kiln dust particles separated from the gases by-passed through said first riser pipe thereby permitting said kiln dust particles to be cooled, separating at least a portion of the kiln dust particles from the gases of said second riser pipe and directing the kiln dust particles thus separated to the lower portion of said first riser pipe so as to contact the kiln gases by-passed upwardly therethrough, and permitting at least certain of the alkali-laden dust particles to be removed from said second riser pipe.

2. The method according to claim 1, wherein the lower end of said second riser pipe is open to the atmosphere and relatively cold atmospheric air is directed upwardly through said second riser pipe at a velocity sufficient to entrain at least a portion of said dust particles while permitting heavier alkali-laden dust particles to be directed downwardly under the influence of gravity in said second riser pipe.

3. The method according to claim 2, wherein said cement kiln is a rotary kiln and said first riser pipe communicates with the hot kiln exit has opening of said rotary kiln so as to permit at least a portion of the kiln exit gases to be by-passed upwardly through said first riser pipe.

4. The method according to claim 3, wherein the gases by-passed through said first riser pipe are directed to a first cyclone separator for separation of said kiln dust particles.

5. The method according to claim 4, wherein the dust separated in said first cyclone separator is directed to the lower portion of said second riser pipe so as to contact said relatively cold atmospheric air directed upwardly therethrough.

6. The method according to claim 5, wherein the air in said second riser pipe is directed to a second cyclone separator for separation of said kiln dust particles.

7. The method according to claim 6, wherein the kiln dust particles separated in said second cyclone separator are directed to the lower portion of said first riser pipe so as to contact the hot kiln gases by-passed therethrough.

8. A method of removing at least a portion of the alkalis present in hot dust-laden exit gases of a cement kiln system comprising by-passing at least a portion of the kiln exit gases upwardly through a first riser pipe communicating with the hot gas opening exit opening of the kiln, separating at least a portion of the kiln dust particles from said by-passed kiln gases and directing said kiln dust particles to the lower portion of a second riser pipe having its lower end open to the atmosphere, directing relatively cold air upwardly through said second riser pipe so as to contact the kiln dust particles directed from said first riser pipe thereby premitting said kiln dust particles to be cooled while simultaneously heating the air of said second riser pipe, separating at least a portion of the kiln dust particles from the air of said second riser pipe and directing the kiln dust particles thus separated to the lower portion of said first riser pipe so as to contact the kiln gases by-passed upwardly therethrough, and permitting heavier alkali-laden dust particles to be directed downwardly under the influence of gravity to the lower end portion of said second riser pipe for removal from the system.

9. A cement kiln plant which comprises a cement kiln, a first riser pipe communicating with the hot exit gas opening of said kiln to permit at least a portion of the hot kiln exit gases to be by-passed upwardly through said first riser pipe, a first particle separator communicating with the upper portion of said first riser pipe to receive said by-passed kiln gases and to separate kiln dust particles therefrom, a second riser pipe having its lower end open to the atmosphere and its upper end portion communicating with a second particle separator, means for directing the separated kiln dust particles from said first particle separator into the lower portion of said second riser pipe, means for directing relatively cold atmospheric air upwardly through said second riser pipe so as to contact the kiln dust particles from said first particle separator and to entrain at least a portion of the lighter of said kiln dust particles, said atmospheric air and entrained kiln dust particles being directed to said second particle separator for separation of said kiln dust particles from said atmospheric air, means to direct said kiln dust particles thus separated from said atmospheric air to the lower portion of said first riser pipe such that at least a portion of said kiln dust particles is entrained by the hot kiln exit gases by-passed upwardly through said first riser pipe.

10. The cement kiln plant according to claim 9, wherein the velocity of the air directed through said second riser pipe is sufficient to entrain at least a portion of the lighter kiln dust particles while at least a portion of the heavier alkali-laden kiln dust particles are permitted to fall under the influence of gravity in a direction countercurrent to the flow of atmospheric air in said second riser pipe.

11. The cement kiln plant according to claim 10, wherein said means for directing precipitated material from said second cyclone separator is in the form of a pipe and said pipe is provided with a branch pipe for removal of at least a portion of the precipitated material from the kiln plant.

12. The cement kiln plant according to claim 11, wherein a third cyclone separator is positioned in communicating relation with said second riser pipe in series with said second cyclone separator and the material outlet of said third cyclone separator is adapted to discharge material separated therein into a collecting vessel so as to be removed from said kiln plant.

13. The cement kiln plant according to claim 12, wherein a pipe is positioned centrally in communicating relation with each of said first and second cyclone separators to receive the exit gases from said cyclone separators, and said centrally positioned pipes are connected in communicating relation with a common conduit in which the gases from the first and second riser pipes are combined.

14. The cement kiln plant according to claim 13, further comprising means to direct the flow of gases in said common conduit upwardly so as to provide upward suction therein.

15. The cement kiln plant according to claim 14, further comprising a throttle valve positioned in each of said pipes communicating centrally with said first and second cyclones so as to provide selective control of the flow of gases in said first and second riser pipes.

16. A cement kiln plant which comprises a rotary cement kiln, a first riser pipe communicating with the hot exit gas opening of said rotary kiln to permit at least a portion of the hot kiln exit gases to be by-passed upwardly therethrough, a first cyclone separator communicating tangentially with said first riser pipe to receive said by-passed kiln gases and to separate kiln dust particles therefrom, a second riser pipe having its lower end open to the atmosphere, a second cyclone separator communicating tangentially with the upper end portion of said second riser pipe, means for directing the separated kiln dust particles from said first cyclone separator into the lower portion of said second riser pipe, means for directing relatively cold atmospheric air upwardly through said second riser pipe so as to contact the kiln dust particles so as to cool said kiln dust particles while simultaneously heating the atmospheric air, the velocity of said atmospheric air being such as to entrain at least a portion of the lighter of said kiln dust particles from said first cyclone separator so as to be directed to said second cyclone separator while permitting at least a portion of the heavier alkali-laden kiln dust particles to fall under the influence of gravity, means to direct the separated kiln dust particles from said second cyclone separator to the lower portion of said first riser pipe such that at least a portion of said kiln dust particles is entrained by the hot exit gases by-passed upwardly through said first riser pipe, a first conduit communicating with the central portion of said first cyclone separator to receive exit gases therefrom, a second conduit communicating with the central portion of said first cyclone separator to receive exit gases therefrom, a throttle valve positioned in each of said first and second conduits to provide relative selective control of the flow of gases in each of said first and second conduits and associated cyclone separators and riser pipes.

17. The cement kiln plant according to claim 16, wherein said first and second conduits communicate with a common conduit and said means for directing relatively cold atmospheric air upwardly through said second riser pipe is in the form of a fan communicating with said conduit to provide an upward suction flow therein.

* * * * *